(12) United States Patent
White

(10) Patent No.: US 7,357,862 B2
(45) Date of Patent: Apr. 15, 2008

(54) FLUID CONDITIONING SYSTEM AND METHOD

(75) Inventor: John W. White, Clyde, TX (US)

(73) Assignee: Flo-Rite Fluids, Inc., Abilene, TX (US)

( * ) Notice: Subject to any disclaimer, the term of this patent is extended or adjusted under 35 U.S.C. 154(b) by 0 days.

(21) Appl. No.: 11/179,309

(22) Filed: Jul. 11, 2005

(65) Prior Publication Data

US 2006/0006106 A1    Jan. 12, 2006

Related U.S. Application Data

(60) Provisional application No. 60/587,004, filed on Jul. 9, 2004.

(51) Int. Cl.
*C02F 1/02* (2006.01)
*C02F 1/48* (2006.01)

(52) U.S. Cl. ............ 210/175; 210/194; 210/222; 210/223; 210/257.1; 210/258

(58) Field of Classification Search .......... 210/174, 210/186, 194, 222, 223, 257.1, 258, 695, 210/175
See application file for complete search history.

(56) References Cited

U.S. PATENT DOCUMENTS

| | | | | |
|---|---|---|---|---|
| 4,491,120 A * | 1/1985 | Hodgkins | .......... | 210/186 |
| 4,532,040 A | 7/1985 | Meeks et al. | .......... | 210/222 |
| 4,711,271 A | 12/1987 | Weisenbarger et al. | .... | 137/827 |
| 4,995,425 A | 2/1991 | Weisenbarger et al. | .... | 137/827 |
| 5,009,791 A * | 4/1991 | Lin et al. | .......... | 210/695 |
| 5,024,271 A | 6/1991 | Meihua | .......... | 166/66.5 |
| 5,052,491 A | 10/1991 | Harms et al. | .......... | 166/304 |
| 5,178,757 A | 1/1993 | Corney | .......... | 210/222 |
| 5,269,915 A | 12/1993 | Clair | .......... | 210/222 |
| 5,366,623 A | 11/1994 | Clair | .......... | 210/222 |
| 5,453,188 A | 9/1995 | Florescu et al. | .......... | 210/222 |
| 5,454,943 A * | 10/1995 | Ashton et al. | .......... | 210/222 |
| 5,520,158 A * | 5/1996 | Williamson | .......... | 210/222 |
| 5,660,723 A * | 8/1997 | Sanderson | .......... | 210/222 |
| 5,700,376 A | 12/1997 | Carpenter | .......... | 210/695 |
| 5,755,970 A | 5/1998 | Fourqurean et al. | .......... | 210/695 |
| 5,871,642 A | 2/1999 | Meeks | .......... | 210/222 |
| 6,056,872 A | 5/2000 | Glass | | |
| 6,216,527 B1 * | 4/2001 | Beecham et al. | .......... | 210/222 |

* cited by examiner

*Primary Examiner*—David A Reifsnyder
(74) *Attorney, Agent, or Firm*—Gardere Wynne Sewell LLP

(57) ABSTRACT

An exemplary method and system for reducing or eliminating the formation of solid precipitates/deposits of a flowing fluid, such as oil, or for reducing or eliminating existing solid precipitates/deposits contained in a flowing fluid, is provided. A fluid conditioning system and method are provided, along with a magnetic fluid conditioner that provides numerous magnetic field transitions through a magnetic flux density in the flow path of the fluid to reduce the formation of precipitates/deposits. A recirculating system using the invention may be set up to reduce deposits, such as paraffin in oil, by circulating oil through a pump, a magnetic fluid conditioner, a tank, and, in one embodiment, and a heater until the deposits/precipitates have been transitioned from a solid to a liquid. A multi-pole magnet, such as an eight-pole magnet, may be used in an embodiment of the present invention to increase the effectiveness of the present invention.

25 Claims, 10 Drawing Sheets

FLUID CONDITIONING SYSTEM AND METHOD

CROSS-REFERENCE TO RELATED APPLICATIONS

Pursuant to 35 U.S.C. § 119 (e), this application claims priority from, and hereby incorporates by reference for all purposes, U.S. Provisional Patent Application Ser. No. 60/587,004, entitled Fluid Conditioning System and Method, naming John W. White as inventor, and filed Jul. 9, 2004.

TECHNICAL FIELD OF THE INVENTION

The present invention relates generally to the field of fluid transportation and more particularly, but not by way of limitation, to a fluid conditioning system and method, and a magnetic fluid conditioner.

BACKGROUND OF THE INVENTION

Several types of fluidized natural resources are extracted from underground formations including, but not limited to, water and hydrocarbons. With the extraction of these resources and the transportation of them (e.g., via pipeline) to a usable location on the surface, an undesirable precipitation of substances can occur within the fluid. For example, with regards to water, calcium carbonate can precipitate to form a scale; and, with regards to hydrocarbons (namely crude oil), paraffin can precipitate. A precipitate may be defined as a substance separating, in solid particles, from a liquid as a result of a chemical or physical change, or as a suspension of small solid particles in a liquid. The term precipitate may also be defined as the act of forming a solid and for the substance that is precipitated out of a solution. Often precipitation in a water or oil pipeline, such as in oil well piping, results in an undesirable deposit buildup on the internal wall of the piping and in storage tanks and other pipeline elements.

Paraffin deposition in crude oil transportation is a major concern in the oil and gas industry. According to some studies, paraffin deposition costs the worldwide oil and gas industry billions of dollars each year. This includes a variety of costs, such as, for example, prevention and remediation costs, reduced or deferred production, well shut-ins, pipeline replacements and/or abandonment, equipment failures, extra horsepower requirements due to clogged systems, and increased manpower needs for various operational concerns. Current methods of combating the negative effects of paraffin buildup include using thermal fluid treatments, pigging, scraping and chemicals. Each of these processes, however, are not only expensive, but can also require extensive amounts of manpower and production downtime. And, in the case of chemicals, environmental and safety concerns are introduced due to inherent risks involved with handling the chemicals. Further, chemicals can reduce the capability to remove undesirable water and other substances from the crude oil.

SUMMARY OF THE INVENTION

From the foregoing it may be appreciated that a need has arisen for a fluid conditioning system and method. In accordance with the present invention, a fluid conditioning system and method is provided that substantially eliminates one or more of the disadvantages and problems outlined above.

According to an aspect of the present invention, a method of controlling a buildup of deposits on internal wall of piping is provided. The method may include positioning a first magnetic fluid conditioner proximate to a piping below ground; and positioning a second magnetic fluid conditioner proximate to a piping above ground.

As a further aspect of the invention, the method may include positioning first and/or second magnetic fluid conditioners at one or more of a variety of locations, including, but not limited to: proximate to a transfer pump, proximate to a bottom of a rod pump, proximate to a bottom of a tubing, proximate to a wellhead, and/or proximate to an oil/gas separator.

According to another aspect, the present invention may include a method of controlling a buildup of deposits on an internal wall of piping and/or storage tanks that includes passing the fluid by a magnetic fluid conditioner above ground. A further feature of this aspect of the invention may include positioning the magnetic fluid conditioner proximate to a transfer pump that is in fluid communication with at least one tank, the method may then include circulating at least a portion of the fluid from the transfer tank through the magnetic fluid conditioner and the pump. Yet further features of this aspect may include: passing at least a portion of fluid by the magnetic fluid conditioner after the at least a portion of fluid is transferred through the pump; passing the at least a portion of fluid by the magnetic fluid conditioner before the at least a portion of fluid is transferred through the pump; and/or circulating at least a portion of the at least a portion of the fluid through at least one heater.

As a further feature of the above aspect, the method may include passing the fluid by a second magnetic fluid conditioner above ground. Yet further features of the invention can include the second magnetic fluid conditioner being proximate to a bottom of a rod pump and the second magnetic fluid conditioner being proximate to a bottom of a tubing of a well, such as an oil well.

The various embodiments and implementations of the present invention provide a profusion of potential technical advantages and benefits that will generally include one or more of the following. A technical advantage of the present invention may include the capability to increase the amount of crude oil being sold by keeping paraffin in solution.

Another technical advantage of the present invention may include the capability to decrease the likelihood that a substance within a fluid will precipitate.

Yet another technical advantage of the present invention may include the capability to decrease costs involved with the control of paraffin buildup.

Still yet another technical advantage of the present invention may include the capability to eliminate or reduce the need for chemicals to treat paraffin or other undesirable substances found in oil, which in turn reduces overall costs and associated environmental and safety risks of using such chemicals.

Another technical advantage of the present invention may include the capability to eliminate a need to provide maintenance for a system that becomes clogged.

Still yet another technical advantage of the present invention may include the capability to increase the capability for an operator to meet the minimum impurity threshold for selling crude oil, resulting in greater overall yields and returns.

Yet another technical advantage of the present invention may include a magnetic fluid conditioner that provides a configuration or arrangement of magnets to provide at least 3 magnetic transitions (or polarity changes), and preferably at least 12 magnetic transitions, to a fluid at a magnetic flux density of at least 1700 Gauss, and preferably at a magnetic flux density of at least 2800 Gauss to 5,000 Gauss, as the fluid flows through one foot of the magnetic conditioner from one end of the magnetic fluid conditioner to the other end. This greatly increases the effectiveness of the magnetic fluid conditioner and increases its capability to reduce the formation of deposits/precipitates, and to convert deposits/precipitates from solids to liquids.

Other technical advantages may be readily apparent to one skilled in the art after review of the following figures, description and claims associated herewith.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like or similar parts, in which.

DETAILED DESCRIPTION OF THE INVENTION

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementations illustrated and described herein. Additionally, the drawings contained herein are not necessarily drawn to scale, and may be provided in a variety of different dimensions, shapes and configurations.

The fluid herein will generally be described as a hydrocarbon fluid (e.g., crude oil or the like) extracted from an underground hydrocarbon formation. Nonetheless, it should be expressly understood that the fluid can be other types of fluid—e.g., water or other fluids that include substances having a potential to precipitate and form deposits on the interior walls of piping.

With respect to hydrocarbon (e.g., crude oil) extraction, the basic ideal process is known and can be generally described as follows: extract crude oil from the formation, reduce the water content therein, and sell the water-reduced crude oil. In this process, however, the crude oil must be transported (e.g., by natural pressure or mechanically induced pumping) via piping from the formation to a location on the surface. In this transportation at least a portion of the crude oil is lost as precipitated paraffin; and, the piping becomes plugged when the precipitated paraffin deposits on the inside walls of the pipe. Additionally, the water content in the fluid can precipitate calcium carbonate or the like in the transportation, causing scale to deposit on the internal walls of the pipe. Thus, it is desirable to keep the paraffin and/or other deposition substances in solution. To this end, it has been discovered that magnetic fluid conditioners help mitigate precipitation of substances within fluid. The magnetic fluid conditioners expose the fluid to a magnetic field, thereby charging the substances to an extent that they no longer attach themselves to the internal wall of the piping or pipeline. Examples of such magnetic field conditioners are disclosed in U.S. Pat. Nos. 4,532,040 and 5,871,642, which are hereby incorporated by reference for all purposes.

Figure 1:
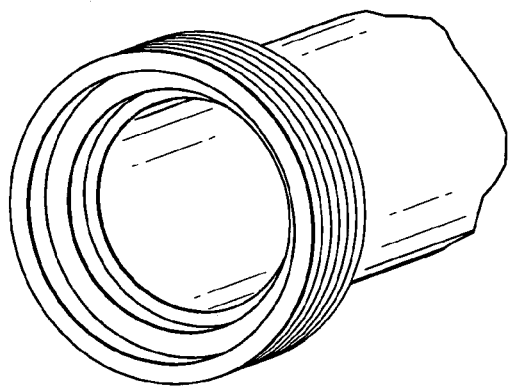
FIG. 1 is a perspective view of an end of a pipe that illustrates the internal volume and the internal surface of the pipe in which a treated fluid has passed.

FIG. 1 is a perspective view of an end of a pipe that illustrates the internal volume and the internal surface of the pipe in which a fluid treated with a magnetic fluid conditioner of a fluid conditioning system has passed. As a result, no buildup of paraffin, calcium carbonate, scale or other precipitates/deposits can be seen in the internal volume of the pipe.

Figure 2:
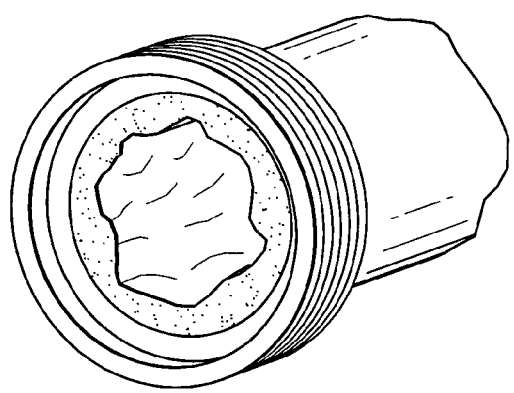
FIG. 2 is a perspective view of an end of a pipe that illustrates the internal volume and the internal surface of the pipe in which a non-treated fluid has passed.

FIG. 2 is a perspective view of an end of a pipe that illustrates the internal volume and the internal surface of the pipe in which a non-treated fluid has passed. As can be seen, the non-treated pipe of FIG. 2 has an accumulation of precipitates/deposits in the internal volume of the pipe that may include, for example, paraffin, calcium carbonate, scale or other precipitates/deposits that has built up on an internal wall of the pipe. The disadvantages inherent with such a buildup of precipitates/deposits, briefly described above, may include, but are not limited to, increasing energy required to transport fluid through the piping and a decreased throughput capacity. Eventually, a pipe such as the pipe in FIG. 2 must be shut down for maintenance, e.g., utilizing fluid treatments, pigging, scraping and chemicals.

In contrast to the non-treated fluid transferred through the pipe of FIG. 2, the fluid being transferred through the pipe in FIG. 1 maintained the precipitates/deposits (namely, the paraffin, in an oil well piping) in solution and thus none of the precipitates/deposits of paraffin was deposited on the inner walls of the piping. In maintaining these substances in solution, an initial charge given to a particular substance can be overcome with further travel of the fluid to an end location—that is, to a certain extent the treated fluid loses its charge and begins to precipitate, once again. The fluid must again be conditioned. To this concern, configurations of a process and system are described below that facilitate the maintenance of the substances in solution from the "womb to the tomb"—that is, from the formation below ground to the end location above ground (e.g., a storage tank)—thereby controlling a buildup of deposits on an internal diameter of the piping.

FIGS. 3A, 3B, 3C, 3D, and 3E are various representations and views of a fluid conditioning system and components that use a magnetic fluid conditioner and that can be utilized above ground to control a buildup of deposits on the internal walls of piping.

Figure 3A:
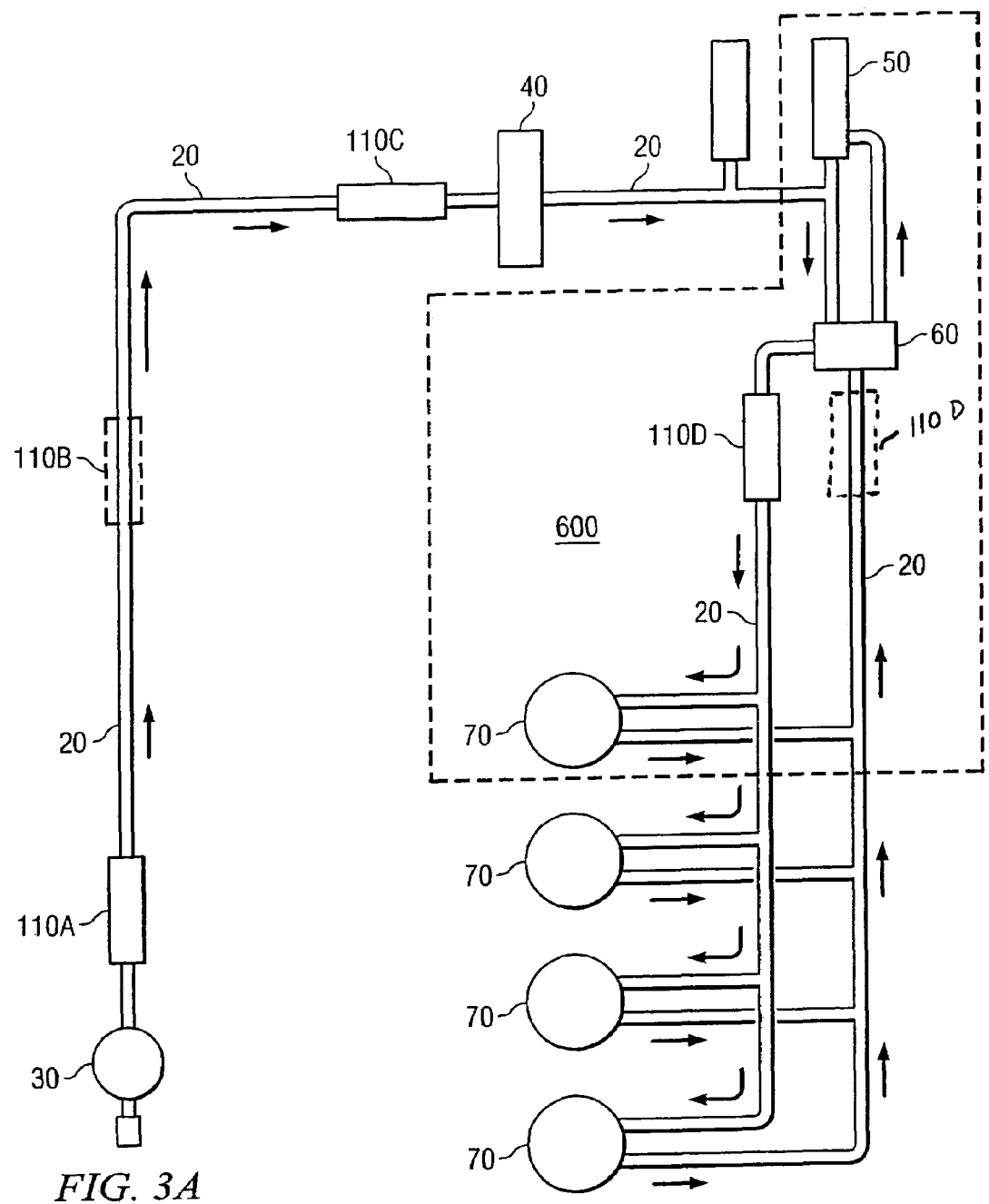
FIGS. 3A, 3B, 3C, 3D, and 3E are various representations and views of a fluid conditioning system and components that use a magnetic fluid conditioner and that can be utilized above ground to control a buildup of deposits on the internal walls of piping.
Figure 3B:
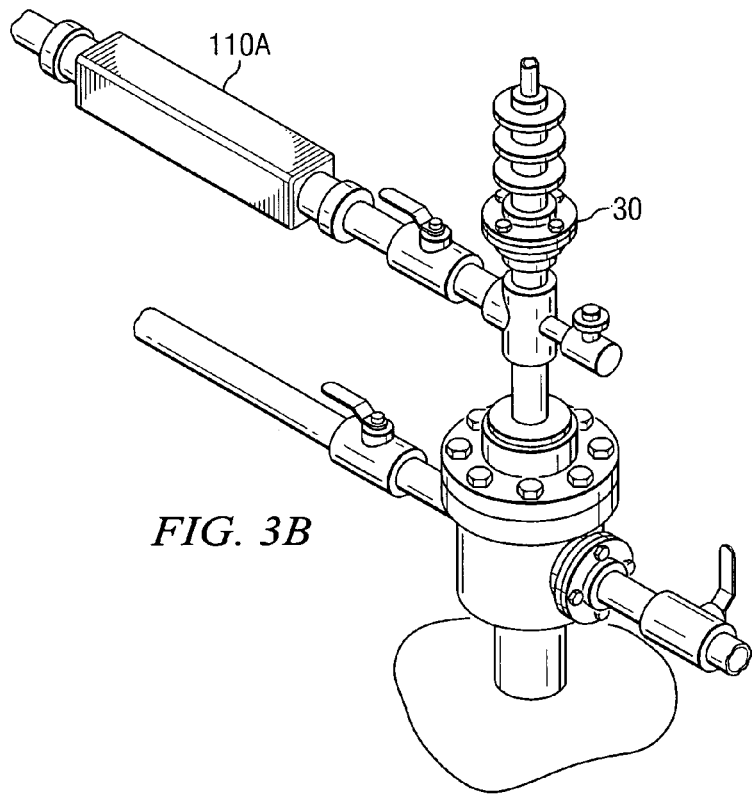
Figure 3C:
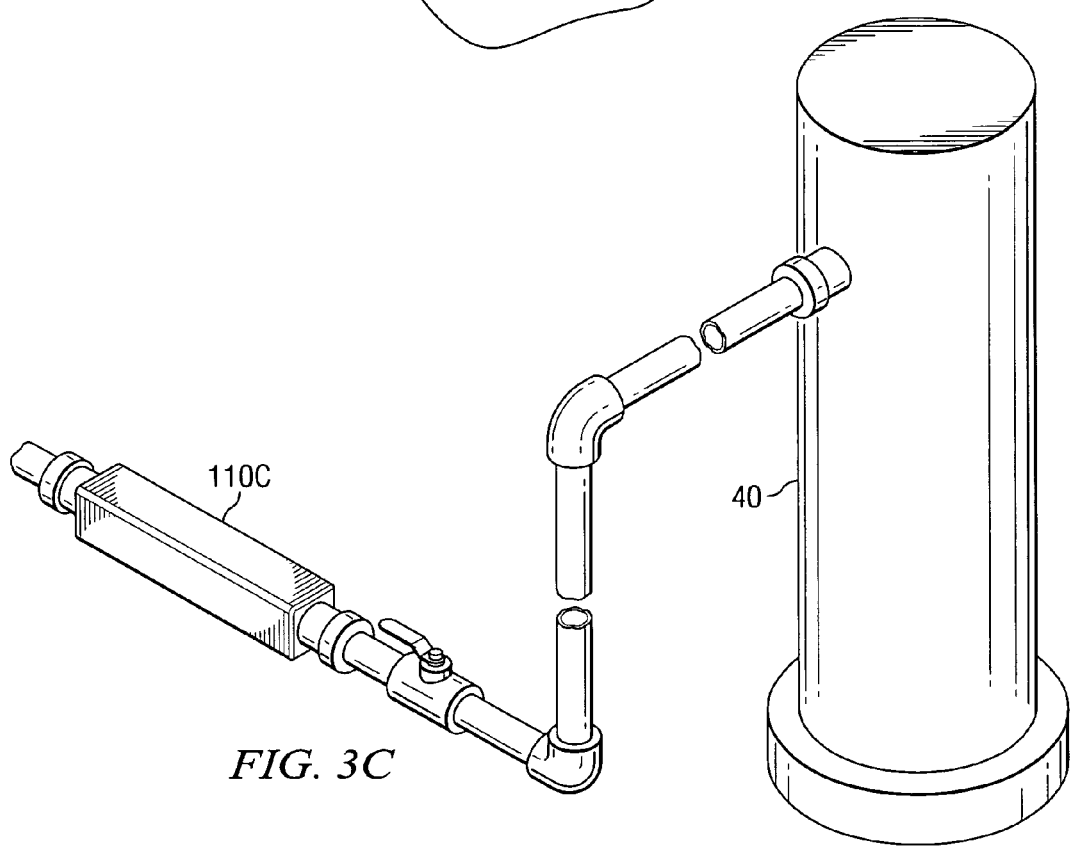
Figure 3D:
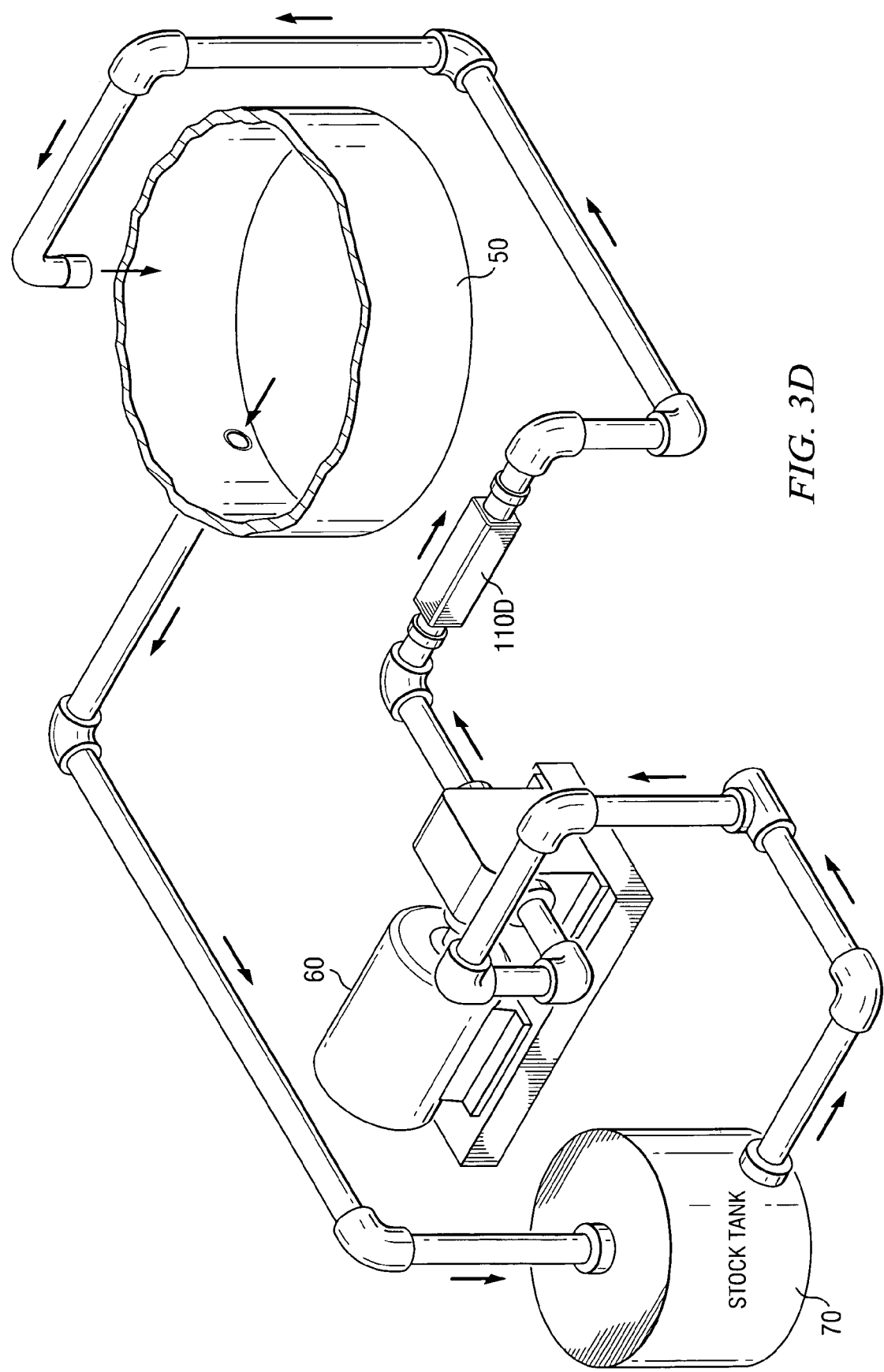

FIG. 3A is a general illustration of a configuration that can be utilized above ground to control a buildup of deposits on the internal walls of piping. FIGS. 3B, 3C, and 3D show in more detail specific features of the general illustration of FIG. 3A. While this illustration has been shown, it should be expressly understood that such an illustration is only intended as serving as an example of one of many configurations that can be utilized. Other configurations will become apparent to one of ordinary skill in the art. Further, in order to simplify FIGS. 3A through 3E, various standard piping equipment, valves and components are not necessarily all shown in FIGS. 3A through 3E because such elements are not necessary to the understanding and illustration of the invention, and such elements are readily understood by one of ordinary skill in the art. FIG. 3A shows an above ground piping configuration; however, as will be described below, configurations can be utilized below ground, to control a buildup of deposits on internal walls of piping below ground.

FIG. 3A generally shows a pipeline 20 that extends from a wellhead 30 to a battery of tanks 70. For sake of simplicity, the pipeline 20 in FIG. 3A is shown without valves and associated piping that can be utilized in transporting a fluid to/from the various component parts illustrated in FIG. 3A. Any two points of pipeline 20 of FIG. 3A may be said to be in "fluid communication" if fluid can flow between the two points, even if additional piping, valves, components, etc. are positioned between the two points. A magnetic fluid conditioner 110A is positioned proximate the wellhead 30 such that the fluid exiting the wellhead 30 will be treated by the magnetic fluid conditioner 110A as it flows through the pipeline 20. An optional magnetic fluid conditioner 110B is shown on the pipeline 20, along with a magnetic fluid conditioner 110C in proximity or adjacent to an oil/gas separator 40 for separating natural gas from oil. In an alternative configuration, the magnetic fluid conditioner 110C may be provided on the opposite side of the oil/gas separator 40. The piping 20 extends next to a heater 50 (an optional or off-line heater is shown next to the primary heater 50), and a pump, such as a transfer pump 60 is shown with a magnetic fluid conditioner positioned at, near or after the discharge of the transfer pump 60. The fluid flows next into one or more of the transfer tanks as desired and as configured using pipeline valves.

A dashed line 600 is shown surrounding what may be considered a separate fluid conditioning system to recirculate a fluid, such as oil, to prevent or reduce the precipitate/deposit of solids in the oil. Using readily available valves, the separate fluid conditioning system shown by dashed lines 600 may be configured as a system to continually circulate the oil around the system until precipitate levels reach desired levels. This provides the advantage of having the magnetic fluid conditioner 110D treat the oil numerous times. The fluid conditioning system may include piping to connect the following: (i) at least one of the tanks 70, with an inlet to receive the fluid, and an outlet operable to discharge the fluid, (ii) the pump 60 having an inlet and an outlet, the pump 60 operable to receive the fluid at its inlet and to discharge the fluid at its outlet, (iii) the magnetic fluid conditioner 110D operable to provide a magnetic field to the fluid at, preferably, adjacent or proximate the discharge of the pump 60, and (iv) a heater operable to increase the temperature of the fluid as it flows through the system as described.

FIG. 3B shows in more detail one configuration of the magnetic fluid conditioner 110A proximate to the wellhead 30. Several configurations of magnetic fluid conditioners will be described in specification below; however, the process and system described herein is not intended to be limited to any specific type of magnetic fluid conditioner, but rather the system and process intends to avail itself of virtually any magnetic fluid conditioner—including not only those that are now known, but also those that will be later developed. For example, such magnetic fluid conditioners can take on a variety of different configurations with different sizes, lengths, and the like, and with static or varying magnetic fields, fluxes and/or field densities depending on the strength and configuration of the one or more magnets used in a magnetic fluid conditioner.

With reference again to FIG. 3A, after passing the fluid through the wellhead 30 and the magnetic fluid conditioner 110A, the fluid is routed to the oil/gas separator 40. The distance from the wellhead 30 to the oil/gas separator 40 can be a considerable distance. As such, any number of magnetic fluid conditioners 110B (shown in dashed lines) can be placed between these points. To a certain degree, the number of magnetic fluid conditioners 110B, if any, are dependent on the distance between wellhead 30 and oil/gas separator 40, the configuration of the pipeline between wellhead 30 and the oil/gas separator 40, the particular magnetic fluid conditioner 110B being utilized, and the speed in which the fluid flows through the system.

Prior to entering the oil/gas separator 40, the fluid is passed by the magnetic fluid conditioner 110C that is proximate to the oil/gas separator 40. FIG. 3C shows in more detail one configuration of the magnetic fluid conditioner 110C proximate to the oil/gas separator 40.

After passing the fluid through the magnetic fluid conditioner 110C and the oil/gas separator 40 the fluid, such as oil or water, may flow through the transfer pump 60 and the magnetic fluid conditioner 110D proximate to the transfer pump 60 and on to the tanks 70. Alternatively, or in addition to this route, the fluid can be circulated (or recirculated) from the transfer pump 60 and/or one or more of the the tanks 70, through heaters 50 back through the transfer pump 60 and the magnetic fluid conditioner 110D proximate to the transfer pump 60 to the tanks 70. Additionally, the fluid can be circulated (or recirculated) from the tanks 70 to the transfer pump 60 and the magnetic fluid conditioner 110D back to the tanks 70. This system or sub-system, as illustrated by the dashed lines denoted by reference numeral 600, may itself be classified as a fluid conditioning system. Similarly, the entire system or configuration of FIG. 3A may be thought of as a fluid conditioning system. Either of these circulations (or recirculations) can be repeated as necessary to decrease water and/or undesireable deposits/precipitates in the fluid and the tanks 70.

Figure 3E:
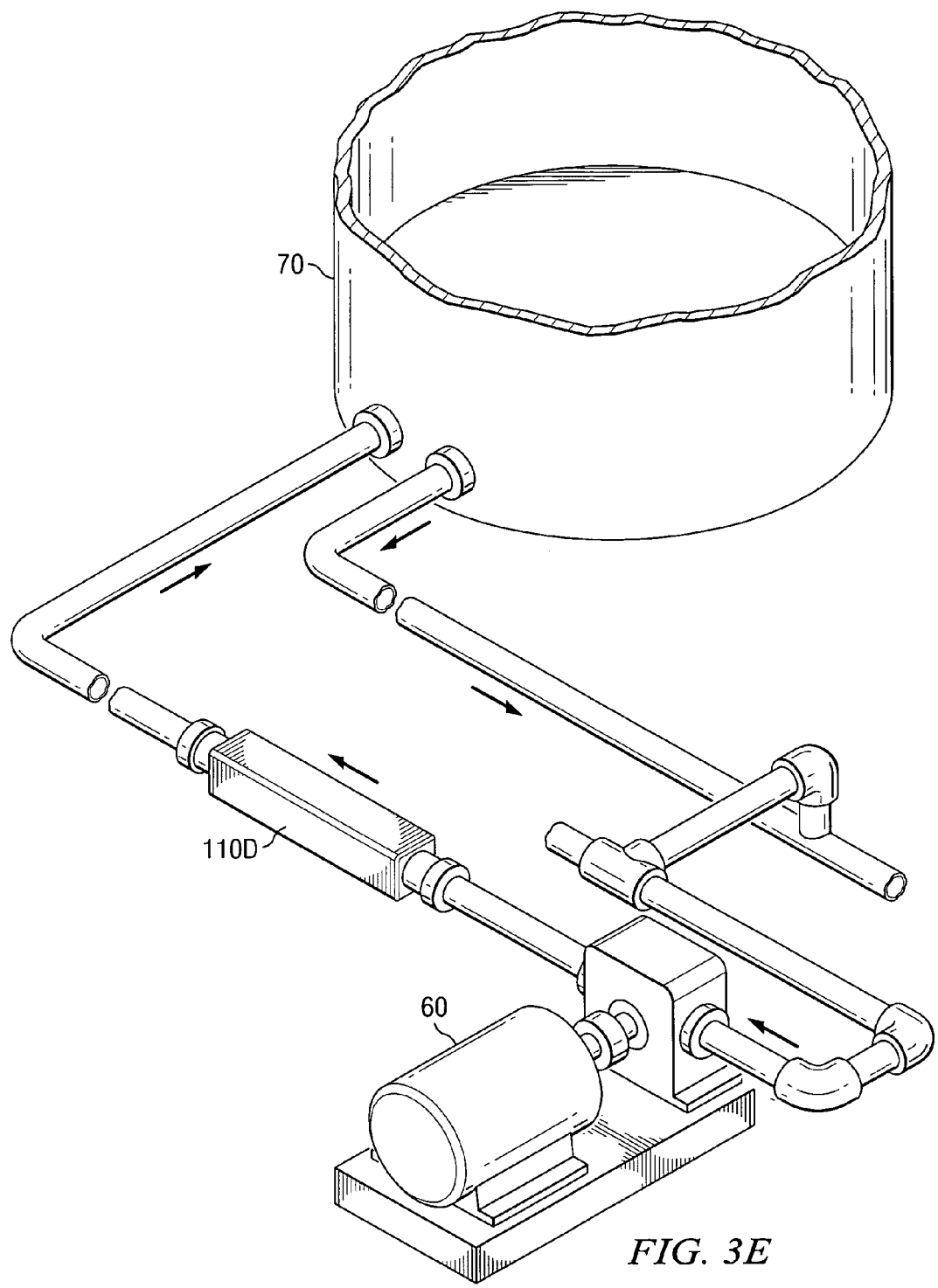

FIGS. 3D and 3E show in more detail one configuration of the magnetic fluid conditioner 110D at the discharge of the transfer pump 60. FIG. 3D has the heaters 50 in the background and FIG. 3E has a portion of tanks 70 in the background. One general benefit of recirculating crude oil from the tanks to the heaters is that water content in the crude oil can be reduced—e.g., to meet minimum impurity requirements for the crude oil to be sold. As discussed above, chemicals being inserted into a fluid can make it difficult to separate the crude oil from the water. With the recirculation described above that utilizes a magnetic fluid conditioner 110D, little or no chemicals are needed— thereby allowing a facilitated breaking of the water from the hydrocarbon. This saves money and is environmentally friendly as compared to the cost and associated pollution caused by the addition of chemicals to treat, for example, oil to remove paraffin deposits. Additionally, the recirculation of the fluid, utilizing the magnetic fluid conditioners 110D, can reduce or prevent water and other undesirable deposits/precipitates (such as paraffin and other "crud") in the tanks 70—e.g., from depositing or precipitating prior to use of the magnetic fluid conditioner 110D—by bringing the accumulation of the undesirables back into solution. Thus, it can be seen that the undesirable deposits/precipitates, a previous waste, is brought back into solution and can be sold in the volume of the oil. A similar process can occur with the remaining portions of the pipeline 20—that is, returning previous deposits back into solution (or preventing or reducing their precipitation/deposition) to not only clean the pipeline 20, but also to sell a product, previously considered a waste.

While only one pipeline 20 has been shown in this configuration of FIG. 3A extending from the wellhead 30 to the battery of tanks 70; it should be expressly understood that other configurations can be utilized with multiple wellhead designs. With such configurations, the component parts described herein (e.g., oil/gas separator 40, heaters 50, transfer pump 60, and battery of tanks 70) will be handling fluid from many wellheads 30. As an example, intended for illustrative purposes only, multiple pipelines from multiple wellheads can join as one pipeline prior to fluid from these multiple wellheads entering the oil/gas separator 40. In such a configuration, a magnetic fluid conditioner 110A can be positioned at each respective wellhead. Other configurations with multiple wellhead designs will be apparent to one of ordinary skill in the art.

Similar to the discussion above concerning considerable distances that can exist between the wellhead 30 and oil/gas separator 40, considerable distances can exist between other component parts. For example, considerable distances can exist between the oil/gas separator 40 and the battery of tanks 70 and considerable distances can exist between either of the circulations (or recirculations) described above. As such, any number of magnetic fluid conditioners 110B can be placed proximate to the pipeline intermediate such considerable distances to control the buildup of deposition on the internal walls of the pipelines. And, in a manner similar to that described above, the number of magnetic fluid conditioners, if any, to a certain degree will be dependent on the distance between the component parts, the configuration of the pipeline between the component parts, and the particular magnetic fluid conditioner 110B, being utilized.

Figure 4:
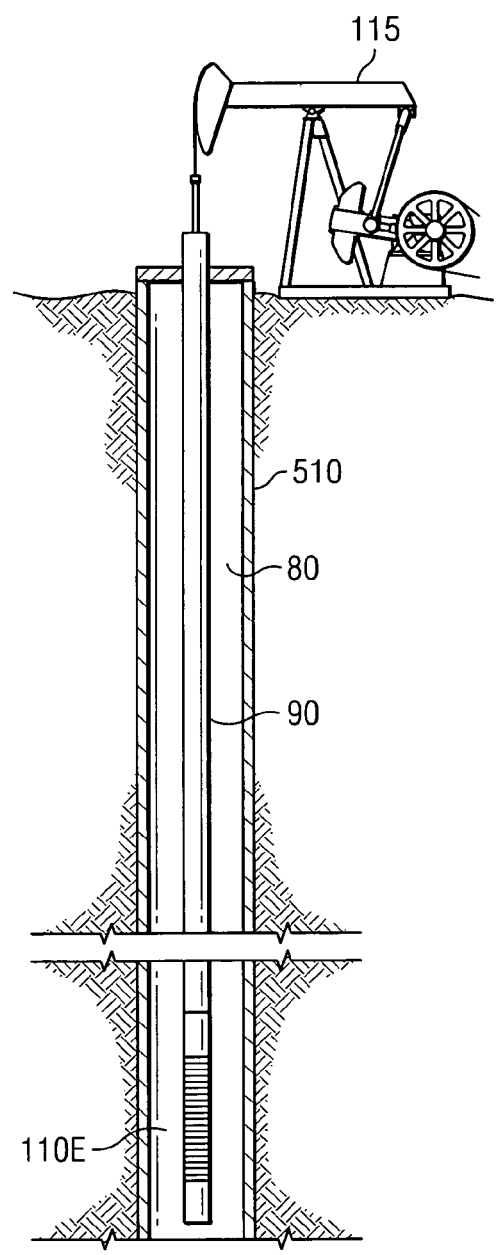
FIG. 4 is a side cutaway view of a fluid conditioning system used in an oil well that illustrates a configuration that can be utilized in-line below ground to control a buildup of deposits/precipitates on the internal walls of a below ground piping.

FIG. 4 is a side cutaway view of a fluid conditioning system used in an oil well that illustrates a configuration that can be utilized in-line below ground to control a buildup of deposits/precipitates on the internal walls of a below ground piping. This configuration can be utilized in conjunction with or separate and apart from the above ground configurations, described above, and other above ground configurations that will become apparent to one of ordinary skill in the art. In the below ground configuration of FIG. 4, a well bore 80 is generally shown that extends from a formation (e.g., a hydrocarbon, namely crude oil, formation) to the surface. As will be recognized by one of ordinary skill in the art, the well bore 80 can be held open via casing 510 or the like. Disposed within the well bore 80 is piping or tubing 90 that establishes fluid communication from the fluid formation to the ground surface. Depending on the particular pressures on the fluid in the formation, a pump jack 115 or the like can be utilized to extract fluid from the formation. Alternatively, the pressure in the formation may be sufficient such that fluid will flow to the surface without mechanical inducement. Regardless of either type of formation, a magnetic fluid conditioner 110E can be placed in a variety of different locations below ground and proximate to the piping or tubing 90. For example, when a pump jack is utilized, the magnetic fluid conditioner 110E can be placed proximate to the bottom of a rod pump—e.g., in a preferred configuration, below a down hole pump. With such a configuration, the first, or nearly the first, item that the fluid (e.g., hydrocarbons, namely crude oil) comes in contact with is the magnetic field of the magnetic fluid conditioner 110E. As such, the buildup of deposits on an interior diameter of piping in the below ground section of the piping is minimized.

As another example, when no pump is present, the magnetic fluid conditioner 110E can be placed below the piping or tubing 90. Other locations for placement of the magnetic fluid conditioner 110E will become apparent to one of ordinary skill in the art. Once again, while several configurations of magnetic fluid conditioners will be described in specification below, the process and system described herein is not intended to be limited to any specific type of magnetic fluid conditioner, but rather the system and process intends to avail itself of virtually any magnetic fluid conditioner—including not only those that are now known, but also those that will be later developed.

In a preferred configuration, the magnetic fluid conditioner 110E is placed at or near the bottom of the well bore 80. This allows down hole tools to be used down hole without encountering the magnetic fluid conditioner, which in a preferred embodiment, may have a flow path or region with a cross-sectional area that is smaller than the flow area through the underground pipe string, such as pipe string 90, where the oil flows out of the formation.

In another preferred embodiment, but not by way of limitation, the magnetic fluid conditioner is provided inline and does not extend with a diameter outside of the normal diameter of the underground pipe string. This allows for the placement of the magnetic fluid conditioner at a strategic location, that has significant space limitations, to prevent, for example, the buildup of paraffin and other undesirables as soon as the oil leaves the underground geologic formation. The capability of the present invention to provide numerous magnetic field transitions within a short distance, such as at least three magnetic field transitions per foot, in the magnetic fluid conditioner provides significant advantages. The multiple magnetic transitions is believed to be required to improve performance of the magnetic fluid conditioner, but this is difficult because of the limited space and volume at the bottom of an oil well. The present invention solves this problem through the unique design of its magnetic fluid conditioner that can be implemented inline with the tubing at the bottom of the hole of a producing well, such as an oil well, or at the bottom of a pump in a well that is being pumped to bring the fluid to the surface.

FIGS. 5, 6A, 6B, 7, 8 and 9 are various views that illustrate a magnetic fluid conditioner 200 according to an aspect of the present invention that can be utilized below ground, such as in the fluid conditioning system of FIG. 4, or above ground, such as in the fluid conditioning systems of FIGS. 3A through 3E.

Figure 5:
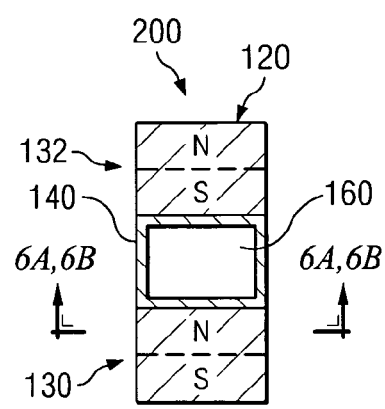
FIGS. 5, 6A, 6B 7, 8 and 9 are various views that illustrate a magnetic fluid conditioner according to an aspect of the present invention that can be utilized below ground, such as in the fluid conditioning system of FIG. 4, or above ground, such as in the fluid conditioning system of FIGS. 3A through 3E.
Figure 6A:
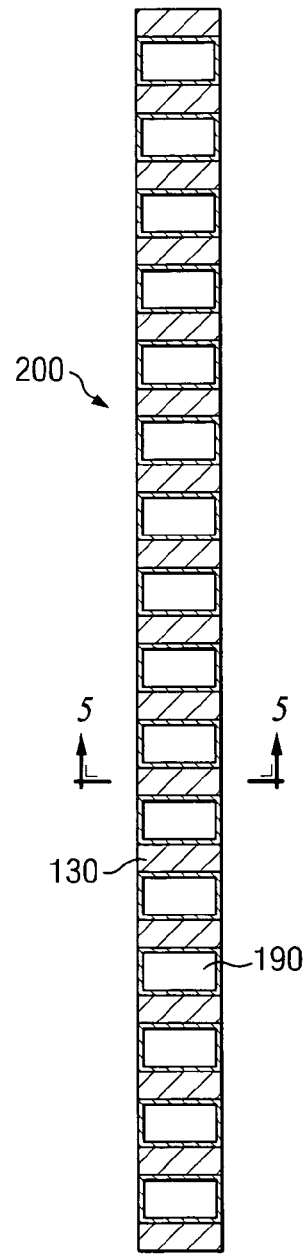

FIG. 5 is an end, cross-sectional view of a magnetic fluid conditioner 200, taken along lines 5-5 of FIG. 6A, that includes a magnet 130 and a magnet 132 disposed around, or on either side of, a stainless steel rectangular tubing 140, which may be implemented using any known or available material, that serves as a fluid flow path or fluid flow region. Not shown in FIG. 5 is an external housing or sleeve that would, in a preferred embodiment, serve as a casing or cover for the magnetic fluid conditioner 200. The stainless steel rectangular tubing 140 generally defines a channel 160, which may be referred to as the flow path or flow region of the rectangular tubing 140, through which fluid will flow. Preferably the stainless steel rectangular tubing 140 is made of an alloy that will not (or minimally) effect the magnetic field generated by the magnet 140 and 132—e.g., stainless steel 304, but may be made of any of a variety of available materials and shapes. The shapes may include, for example, circular, triangular, square tubing or cylindrical shape. As an example of size, intended for illustrative purposes only, the stainless steel rectangular tubing 140 may be ½ inch by 1 ½ inch and the magnets 130 and 132 may be ½ inch by ½ inch by 1 inch, with the ½ inch by 1 inch side serving as the "working face" or "working surface" of the magnet, which is the face closest to the side of the rectangular tubing 140.

FIG. 6A is a side, cross-sectional view of the magnetic fluid conditioner 200, without an external housing or sleeve being shown, taken along lines 6A-6B of FIG. 5, that illustrates an array or stack of magnets 130 each separated by a spacer 190, which is preferably provided as a plastic spacer, and extending from a first end, at the top of the page, to a second end, at the bottom of the page. The magnets are arranged in a row or stacked fashion such that the two stacks of magnets are positioned on opposite sides of the rectangular tubing 140. The working surface of the magnets are oriented such that at least one north and south pole of the magnets 130 are positioned opposite each other across the flow region of the rectangular tubing 140 to provide, preferably, a magnetic flux density of at least 1700 Gauss in the center of the flow region. The magnets 130 may be separated from the magnet above and/or below each other using a spacer 190 as shown in FIG. 6A. The orientation of the poles of each magnet are preferably arranged such that there is a magnetic attraction between the magnets that are stacked above and below each other in the stack of magnets. This adds additional stability to the stack of magnets, even through the spacer 190 in certain embodiments. In an alternative embodiment, a glue or adhesive may be used between the magnet 130 and the spacer 190 to provide additional mechanical support to the stack of magnets.

The magnets 130 are preferably implemented using rare earth magnets, with a magnetic flux (or field) density sufficient to provide a magnetic flux density in the fluid flow path of, for example, at least 1700 Gauss, but preferably as high as possible. In a preferred embodiment, the magnetic flux density in the fluid flow path above ground may be provided at 3500 to 4000 Gauss. In other embodiments the magnetic flux density is provided in a range between 1700 Gauss and 5500 Gauss, and a range between 2800 Gauss and 3000 Gauss for magnetic fluid conditioner positioned down hole. In one preferred embodiment, the materials used for the magnet is neodymium iron boron, which preferably is provided in a water resistant housing, and may include a nickel plating (such as $\frac{1}{5000}^{th}$ of an inch thick coating), or other types of coatings as desired. The use of a plurality of magnets 130 helps to maximize the exposure of the fluid flowing through the flow path 160 to numerous magnetic field transitions (which include polarity changes of the magnetic field) generated by the magnets 130. As an example of the size, intended for illustrative purposes only, the length of the magnetic fluid conditioner 200 can be four to eight feet long from the first end to the second end. In a preferred embodiment, the number of magnetic field transitions experienced by a fluid flowing from the first end to the second end will be at least three magnetic field transitions per foot, and preferably at least eleven magnetic field transitions per foot. In certain embodiments, at least 30 magnetic field transitions per foot may be provided, especially in applications such as down hole oil well applications where space is limited.

Figure 6B:
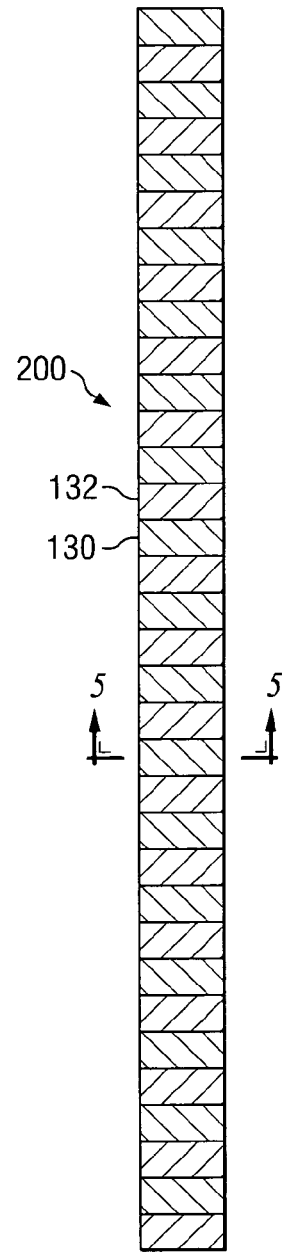

FIG. 6B is a side, cross-sectional view of the magnetic fluid conditioner 200, without an external housing or sleeve being shown, taken along lines 6A-6B of FIG. 5, that illustrates an array or stack of magnets 130 each stacked on top of one another, and does not include the spacer 190 of FIG. 6A between each magnet, such as the magnet 130 and a magnet 132. The orientation of the stack of magnets is as discussed above in connection with FIG. 6A. This provides even additional magnetic field transitions or field reversals, which is believed to significantly improve the performance of the magnetic fluid conditioner 200.

Figure 7:
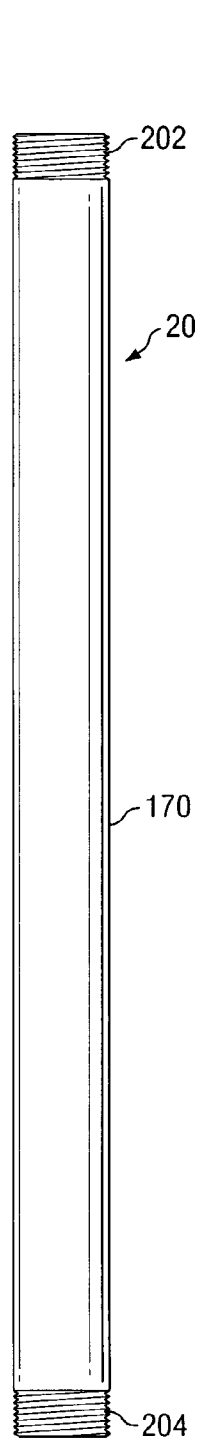

FIG. 7 shows an outside view of the magnetic fluid conditioner 200, which is arranged as a pup joint pipe 170, that serves as an outer or casing, housing or sleeve in which the assembly of either FIG. 6A or 6B can be inserted. A thread collar 202 may be provided at the first end of the magnetic fluid conditioner 200 and a thread collar 204 may be provided at the second end of the magnetic fluid conditioner 200. Such threading can allow the magnetic fluid conditioner 200 to be attached to well tubing, inline, and lowered to the bottom of the well, or provided above ground and connected to a piping as desired. In one embodiment, the pup joint pipe 170 may be implemented using stainless steel mechanical tubing with an outer diameter of 1.66 inches or larger.

Figure 8:
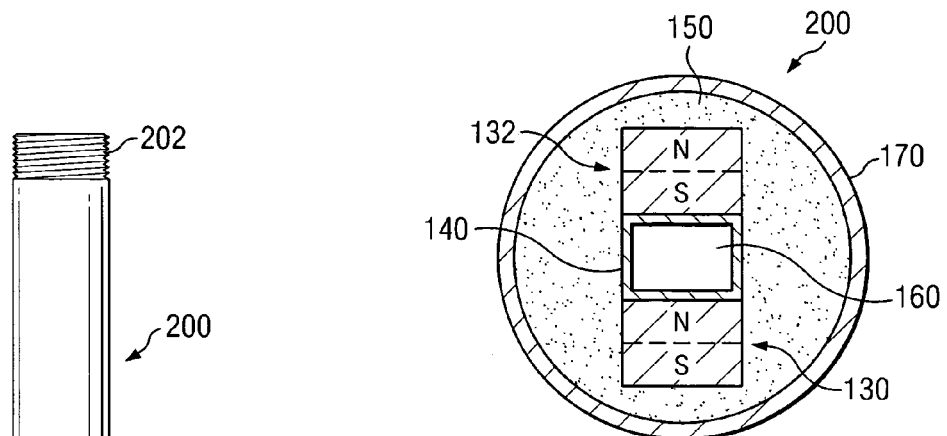

FIG. 8 is an end, cross-sectional view of a magnetic fluid conditioner 200, similar to FIG. 5, that includes the magnet 130 and the magnet 132 disposed around, or on opposite sides of, the rectangular tubing 140, along with an epoxy filler 150 mounted or positioned around the magnets 130 and 132 and the stainless rectangular tubing 140 and inside of the pipe 170. The cross-sectional area of the channel 160 in the center of the magnetic fluid conditioner 200 may be the same cross-sectional area as the tubing in a well bore, or smaller. The circular cross-sectional configuration of the pup joint pipe 170 allows the magnetic fluid conditioner 200 to fit easily within a circular well bore. It should be recognized by one of ordinary skill in the art that the size and configuration described with the reference to the configuration of the magnetic fluid conditioner 200 of FIGS. 5, 6A, 6B, 7, 8 and 9 can vary depending on the particular application in which the magnetic fluid conditioner 200 will be utilized.

The magnetic fluid conditioners provide the capability to expose a fluid, such as oil or water, to multiple pole reversals or magnetic transitions, i.e., fluid flows through magnetic fields setup in opposite or different directions, over a short distance. This may include the fluid flowing through three or more magnetic transitions or magnetic pole reversals of at least 1700 Gauss over a one foot length of a magnetic fluid conditioner. In another embodiment, the fluid flowing through eleven or more magnetic transitions (also referred to as magnetic pole reversals) with a magnetic flux density in the center of the flow path of at least 1700 Gauss as the fluid flows along a one foot length of a magnet fluid conditioner. This is believed to greatly enhance the effectiveness of the present invention.

The stainless steel rectangular tubing 140 generally defines a channel 160, which may be referred to as the flow path or flow region of the rectangular tubing 140, through which fluid will flow. Preferably the stainless steel rectangular tubing 140 is made of an alloy that will not (or minimally) effect the magnetic field generated by the magnet 140 and 132—e.g., stainless steel 304, but may be made of any of a variety of available materials and shapes, such as circular, triangular, square, etc. shapes. As an example of size, intended for illustrative purposes only, the stainless steel rectangular tubing 140 can be ½ inch by 1 ½ inch and the magnets 130 and 132 may be ½ inch by ½ inch by 1 inch, with the ½ inch by 1 inch side serving as the "working face" or "working surface" of the magnet, which is the face closest to the side of the rectangular tubing 140.

Figure 9:
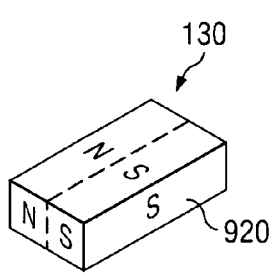

FIG. 9 is a perspective view of a two-pole magnet 130 which may be implemented, in one embodiment, in the magnetic fluid conditioner 200 of the present invention. A working face or surface 920 is shown as a south pole, which may be placed against a surface of the rectangular tubing 140. The magnet stacked or positioned above or below the magnet 130 of FIG. 9, similar to the stack of magnets shown in FIGS. 6A and 6B, will preferably be similar to the magnet 130 except that the poles will be reversed. This results in opposite poles being aligned in the stack and an attractive force between the two magnets. This provides additional stability to the stack of magnets because of the presence of the attractive force.

Figure 10:
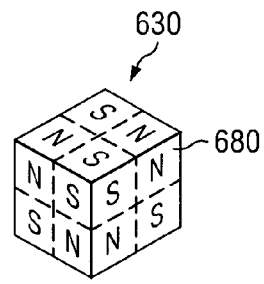
FIGS. 10, 11 and 12 are various views that illustrate another magnetic fluid conditioner, which utilizes multi-pole magnets, according to an aspect of the present invention that can be utilized below ground, such as in the fluid conditioning system of FIG. 4, or above ground, such as in the fluid conditioning system of FIGS. 3A through 3E.
Figure 11:
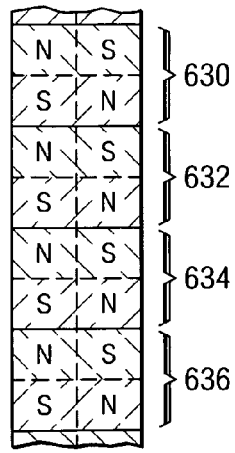
Figure 12:
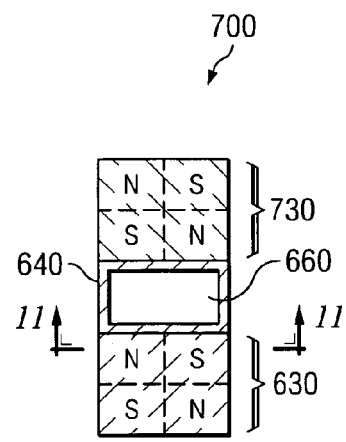

FIGS. 10, 11 and 12 are various views that illustrate another magnetic fluid conditioner, which utilizes a multi-pole magnet, according to an aspect of the present invention that can be utilized below ground, such as in the fluid conditioning system of FIG. 4, or above ground, such as in the fluid conditioning system of FIGS. 3A through 3E. This magnetic fluid conditioner uses multi-pole magnets, such as a four, eight or sixteen pole magnet for example, and is used as described above in connection with FIGS. 5, 6A, 6B, 7, 8 and 9.

FIG. 10 is a perspective view, similar to FIG. 9, of a multi-pole magnet 630, which may be implemented in the magnetic fluid conditioner 200 of the present invention, that includes a total of eight poles. A working face or surface 680 is shown that includes a south and north pole along the top row from left to right, and a north and south pole along the bottom row from left to right. The working surface 680 is placed next to a surface of the rectangular tubing 140 of FIGS. 5 and 8 to setup various magnetic fields (attractive forces) in the flow region with a corresponding multi-pole magnet positioned next to the opposite surface of the rectangular tubing 140. The multi-pole magnet stacked or positioned above or below the multi-pole magnet 630 of FIG. 10, similar to the stack of magnets shown in FIGS. 6A and 6B, will preferably be similar to the multi-pole magnet 130 except that the poles will be reversed to set up an attraction with the four poles of the corresponding surface of the multi-pole magnet 630. This results in opposite poles being aligned in the stack and an attractive force between the two magnets. This provides additional stability to the stack of magnets because of the presence of the attractive force.

Although the multi-pole magnet 630 is shown preferably in a rectangular or square cube shape, it should be understood that any of a variety of other shapes may be utilized for the multi-pole magnet 630. The shapes may be dictated by the tubing used to provide the flow region for the magnetic fluid conditioner. For example, the multi-pole magnet 630 may be provided, in one embodiment, as a circular cylindrical shape, a horseshoe shape, a ring or washer shape, and magnetized to provide the desired magnetic flux density in the flow region, and the desired number of poles in the appropriate locations.

FIG. 11 is a side, cross-sectional view taken along lines 11-11 of FIG. 12, of a section of multi-pole magnets stacked upon one another that includes the multi-pole magnet 630, a multi-pole magnet 632, a multi-pole magnet 634, and a multi-pole magnet 636, for use in a magnetic fluid conditioner 200, without an external housing or sleeve being shown, similar to FIG. 6B. The orientation of the stack of magnets is as discussed above in connection with FIG. 6B. This provides still additional magnetic field transitions or field reversals, which is believed to significantly improve the performance of the magnetic fluid conditioner 200.

FIG. 12 is an end, cross-sectional view of a magnetic fluid conditioner 700, similar to FIG. 5, that includes the multi-pole magnet 630 and a corresponding multi-pole magnet 730 positioned on opposite sides of a rectangular tubing 640, which may be implemented using any known or available material, that serves as a fluid flow path or fluid flow region 660. Not shown in FIG. 12 is an external housing or sleeve that would, in a preferred embodiment, serve as a casing or cover for the magnetic fluid conditioner 700, similar to what was shown and described in connection with FIG. 7. The rectangular tubing 640, will preferably be provided as a stainless steel tubing, generally defines the channel or flow region 660, which may be referred to as the flow path or flow region of the rectangular tubing 640, through which fluid will flow. As is illustrated, multiple magnetic field transitions may be established through the flow region 660. In a preferred embodiment, the number of magnetic field transitions experienced by a fluid flowing from the first end to the second end will be at least three magnetic field transitions per foot, and preferably at least eleven magnetic field transitions per foot. In certain embodiments, at least 30 or more magnetic field transitions per foot may be provided, especially in applications such as down hole oil well applications where space is limited.

Figure 13:
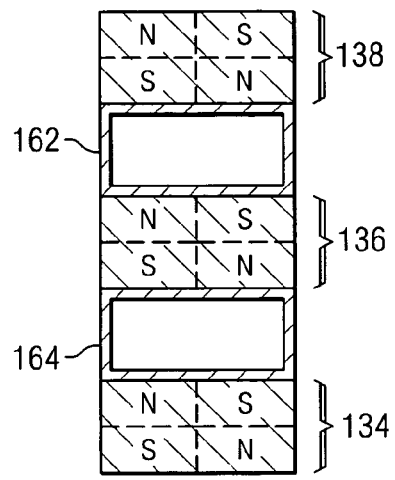
FIGS. 13 and 14 include end, cross-sectional views of the internal portion of yet another magnetic fluid conditioner, and illustrate that more than one flow path or flow region may be implemented in alternative embodiments of the present invention.
Figure 14:
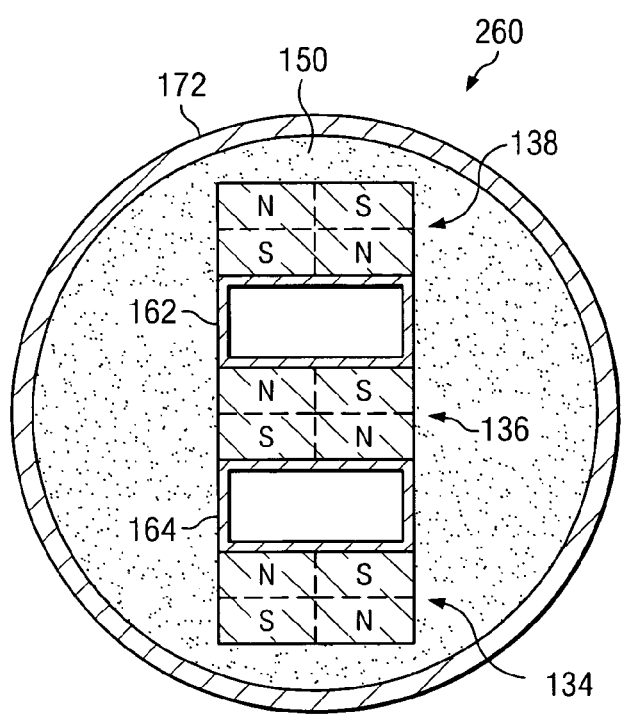

FIGS. 13 and 14 include end, cross-sectional views, similar to FIGS. 12 and 8, of the internal portion of yet another magnetic fluid conditioner 260, and illustrate that more than one flow path or flow region may be implemented in alternative embodiments of the present invention. A rectangular tubing 162 and 164, each with a channel or flow region defined therein for fluid to pass, are illustrated, along with three stacks of magnets. FIG. 14 also illustrates the sleeve or pipe 170, along with an epoxy 150, or other available materials or plastics, filled area within the sleeve or pipe 170. This ensures that the structures within the sleeve or pipe 170 are maintained in place, and further provide protection of the various magnets of the magnetic fluid conditioner 260 from fluids, which in certain implementations, may cause serious damage to the magnets.

This embodiment provides the significant advantage of allowing additional flow through the magnetic fluid conditioner 260, while only using three stacks of magnets instead of two dedicated stacks of magnets for each rectangular tubing that totals four stacks of magnets. This results in a savings of one stack of magnets, which may provide significant savings. Although two channels or flow regions are illustrated in the embodiments of FIGS. 13 and 14, it should be understood that additional flow regions may be included as part of the present invention.

A multi-pole magnet 138, which is shown with eight poles (four of which are visible from this view), similar to the multi-pole magnet 630 of FIG. 10, is shown positioned along one side of the rectangular tubing 162, while a multi-pole magnet 136 is shown positioned along the opposite side of the rectangular tubing 162. A magnetic flux density is established in the channel or flow region of the rectangular tubing 162 by the opposite polarities setup across from one another by the multi-pole magnet 138 and the multi-pole magnet 136. Assuming the multi-pole magnet 138 and the multi-pole magnet 136 are similar to the multi-pole magnet 630 of FIG. 10, which includes 8 poles, then four north/south poles would be established between the two multi-pole magnets in the flow region of the rectangular tubing 162.

The opposite side of the multi-pole magnet 136 is positioned along a side of the rectangular tubing 164, while a side of the multi-pole magnet 134 is positioned opposite along the opposite side of the rectangular tubing 164. Assuming the multi-pole magnet 136 and the multi-pole magnet 134 are similar to the multi-pole magnet 630 of FIG. 10, which includes 8 poles, then four north/south poles would be established between the two multi-pole magnets in the flow region of the rectangular tubing 164. Although in a preferred embodiment the magnets in each stack would be configured the same, the present invention may include different types of magnets in the number of poles and the size, although magnetic transitions will be established in the flow region.

FIGS. 15, 16, 17, and 18 are illustrative of a configuration of yet another magnetic fluid conditioner 400.

Figure 15:
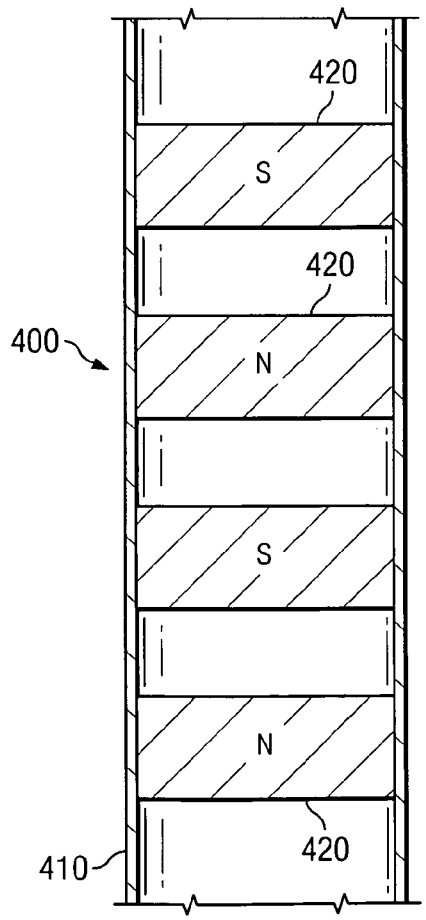
FIGS. 15, 16, 17, and 18 are illustrative of a configuration of yet another magnetic fluid conditioner.
Figure 17:
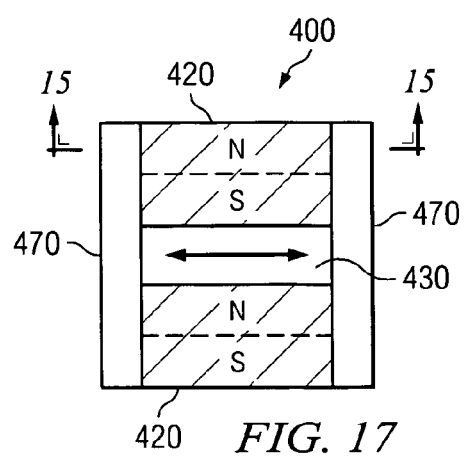

FIG. 15 is a top, cross-sectional view, taken along lines 15-15 of FIG. 17, of a section of the magnetic fluid conditioner 400 showing a plurality of rectangular cylinders or magnet tubes 420 mounted horizontally to, and on both sides of, a fluid flow path, not shown in FIG. 15, that each contain, in one embodiment, a two-pole or north/south magnet, oriented as illustrated in FIGS. 15 and 17. A flat plate 410 is used in the embodiment of the magnetic fluid conditioner 400 of FIG. 15 to serve as a support structure for the various magnetic tubes 420. The flat plate 410 may be provided as any available material, but preferably as stainless steel to minimize any effect on the magnetic flux density created by the various magnetic tubes 420.

Figure 16:
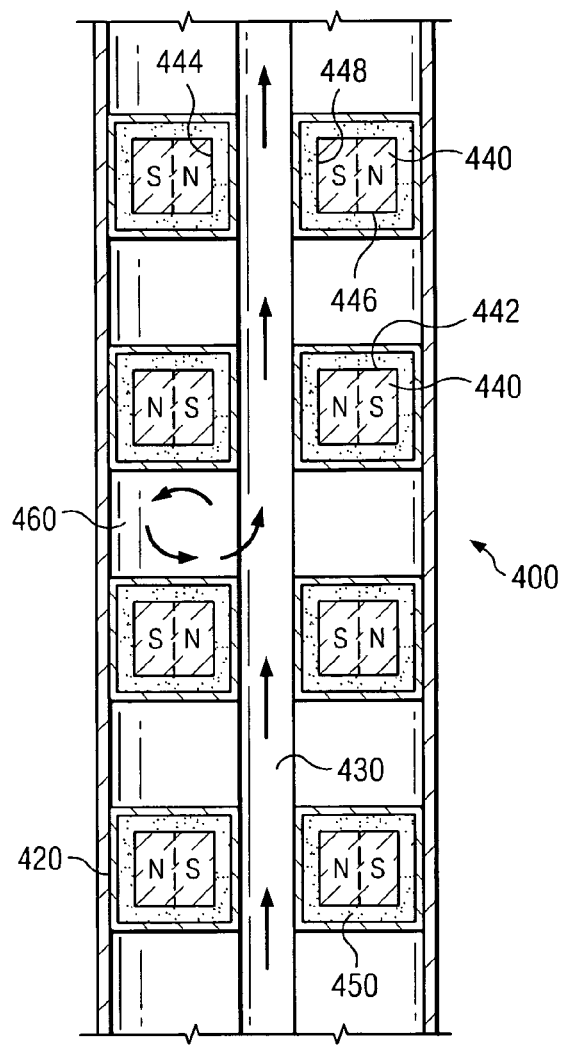

FIG. 16 is a side, cross-sectional view of the segment of the magnetic fluid conditioner 400 as shown in FIG. 15 that illustrates the fluid flow path or fluid channel 430 and the internal portions of the magnet tubes 420. An example of the magnetic orientation of the magnets of the magnetic tubes 420 is illustrated in FIG. 16. The magnetic tubes 420 are, preferably, made of stainless steel, and include magnets 440 with an epoxy 450 surrounding such magnets 440 to secure it in place, and to provide protection from moisture, which may damage or destroy certain rare earth magnets, such as neodymium iron boron magnets. The magnets 440 are preferably arranged in a north and south magnetic orientation with sides 448, 444 opposing each other (in an attraction orientation) across the fluid channel 430. The magnetic tubes 420 are preferably made of a stainless steel alloy that will not effect (or will minimally effect) the magnetic field generated by the magnets 440—e.g., stainless steel 304. The fluid channel 430 generally includes an open area from one end to another end in the magnetic fluid conditioner 400;

however, the flow of fluid through the magnetic fluid conditioner 400 can additionally flow between gaps 460 between the magnetic tubes 420. Upon flow of the fluid into the gaps 460, a slight turbulence can be created while exposing fluid in a manner similar to that described above to another (or multiple) north and south magnetic orientations between the sides 442 and 446, which are opposing each other across the gap 460. This is believed to increase the effectiveness of the present invention by exposing the flowing fluid to additional magnetic transitions to further reduce or eliminate the precipitation of solids, such as paraffin commonly found in oil, from the fluid.

Figure 18:
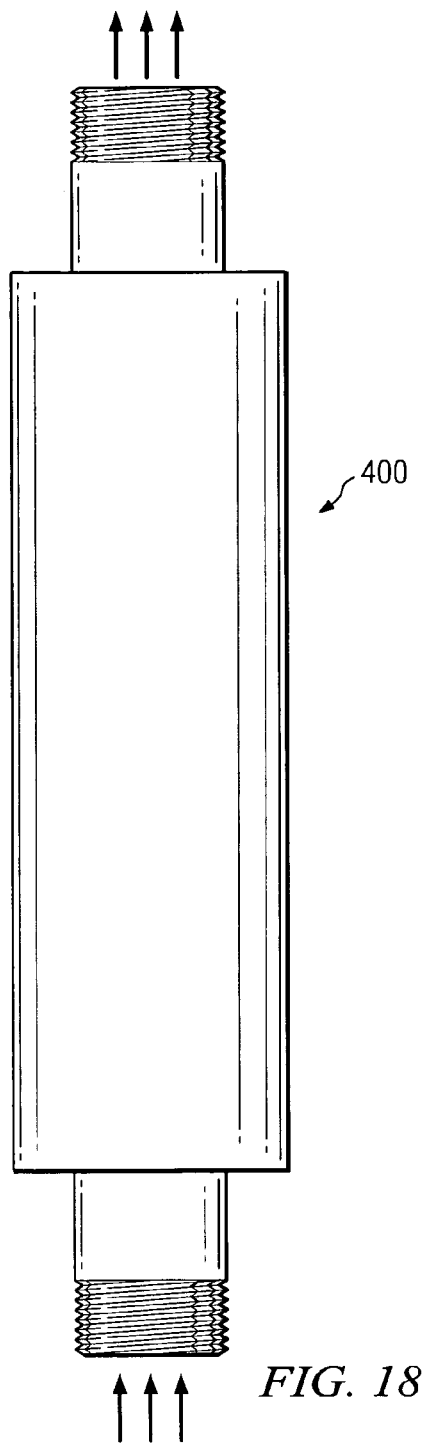

FIG. 17 is an end, cross-sectional view of the magnetic fluid conditioner 400, in one embodiment, showing the stainless steel magnet tubes 420, fluid channel 430, and block off plates 470, which may be provided at each end of the magnetic fluid conditioner 400 to further secure the assembly of the plurality of magnetic tubes 420 to an outer casing or sleeve, as illustrated in FIG. 18.

FIG. 18 is a perspective view of the magnetic fluid conditioner 400, in one embodiment, showing an outer case or sleeve, along with a threading or coupling added to both ends of the magnetic fluid conditioner 400 that allows coupling of the magnetic fluid conditioner 400 to other piping pieces, such as those illustrated in FIGS. 3A through 3E.

Figure 19:
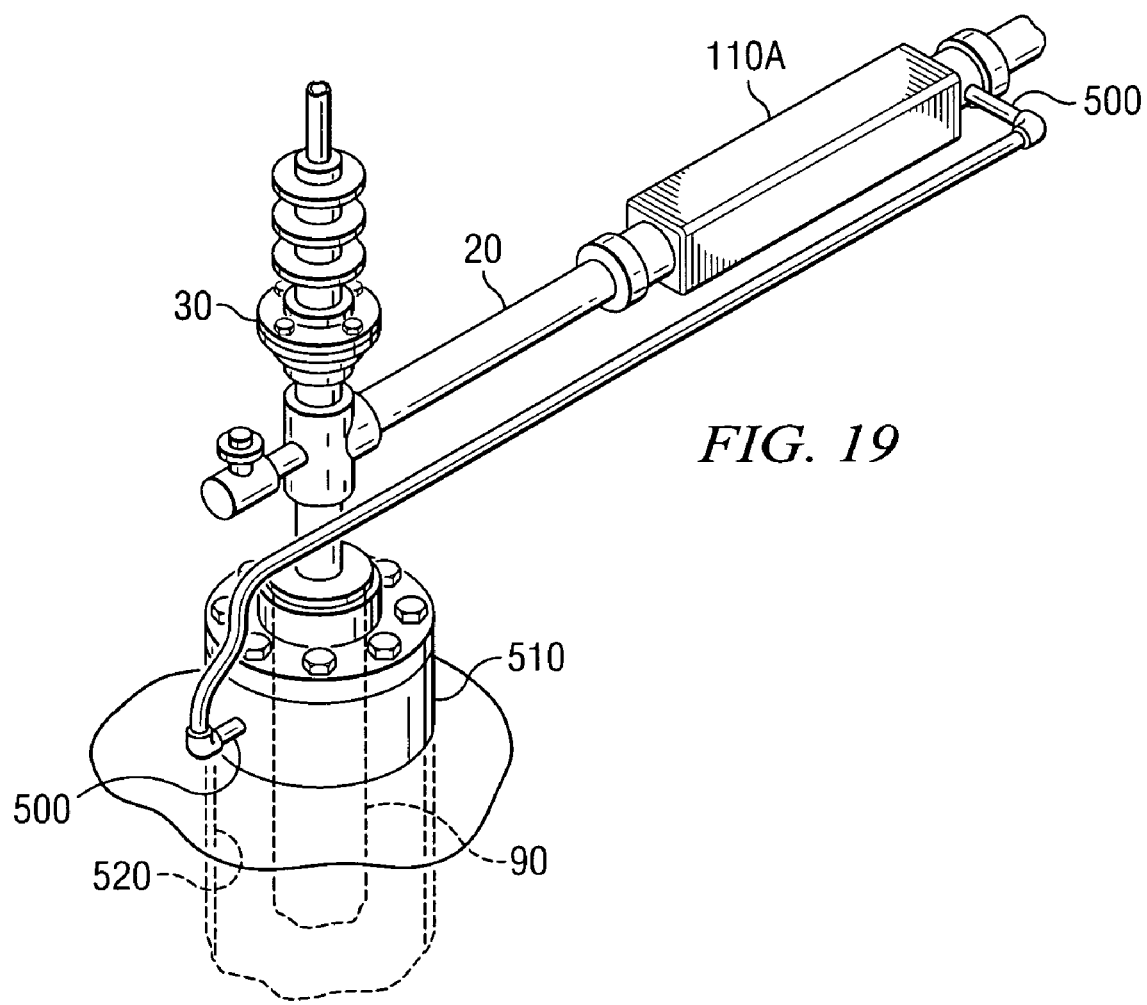
FIG. 19 is a perspective view that illustrates another aspect of the invention where at least a portion of the treated fluid leaving a wellhead of a well is provided back into the well through the annulus of the well between a casing and a tubing of the well.

FIG. 19 is a perspective view that illustrates another aspect of the invention where at least a portion of the treated fluid leaving a wellhead of a well is provided back into the well through the annulus of the well between a casing and a tubing of the well. After fluid flow has exited the wellhead 30 and passed through a magnetic fluid conditioner 110A, a portion of the just treated fluid can be extracted through a port 500 to be routed back down the well bore into an annulus 520 between the casing 510 and the tubing 90. The treated fluid in the annulus 520 helps to prevent a buildup of deposits that can accumulate on the inner wall of the casing 510. The fluid in the annulus 520 simply travels back down to the formation and is recirculated back up the tubing via pumping or other pressure in the well. This process may be referred to as "slip-streaming" and is believed to increase the effectiveness of the present invention when implemented.

With the several configurations described above, it should be understood that different configurations can utilize magnetic fluid conditioners at different locations. For example, in some configurations, the magnetic fluid conditioner may be placed at only a location proximate to the transfer pump 60 while in other configurations a magnetic fluid conditioner can be placed at only a location proximate to the wellhead 30 or at only a location proximate to the oil/gas separator 40. In yet further configurations, a magnetic fluid conditioner may be placed proximate a component part not expressly described herein. The placement of magnetic fluid conditioner can be placed at a virtually limitless number of locations. To a certain degree, such placement and/or placements will depend on the particular system and configuration utilized.

In one configuration, the fluid is oil, and oil is recirculated through a system that includes a pump, a magnetic fluid conditioner, a heater, and a storage tank. In a preferred embodiment, such as that shown in FIG. 3A, the magnetic fluid conditioner is placed at the discharge of the pump, such as a transfer pump, to ensure that the fluid is provided through the magnetic fluid conditioner at a known or desired velocity.

In a preferred configuration, at least one magnetic fluid conditioner is placed proximate to the piping underground, in an in-line configuration, and at least one magnetic fluid conditioner is placed proximate to the piping above ground. The preferred location underground is either below the downhole pump or at the bottom of the tubing. The preferred location above ground is at the transfer pump. A variety of intermediate locations for a magnetic fluid conditioner can be utilized between these two locations, which as indicated above can depend on the particular system and configuration utilized.

As a further benefit that can be seen with the above description, the placement of the magnetic fluid conditioner can help clean previously clogged pipelines—that is, lines that were clogged prior to the installation of the magnetic fluid conditioner(s). Such a cleaning occurs by bringing precipitated deposits back into solution. In a sense, the use of the system and method provided herein can be seen as a reversal system and process that reverses the previous harmful precipitation of deposits. Thus, the system and method described herein, can not only serve as a remediation measure for removing deposition that occurred in the past (e.g., deposition of paraffin and calcium carbonate), but can also serve as a preventive measure that helps prevent potential future deposition. It can be seen that the system and method can allow the previously deposited precipitates to return to solution to be sold along with the remaining fluid—that is, the previously considered waste product is turned into a marketable product.

Further, the present invention includes unique magnetic fluid conditioners that provide the desired properties. The magnetic fluid conditioners, in certain embodiments, provide the capability to expose a fluid, such as oil or water, to multiple pole reversals or magnetic transitions, i.e., fluid flows through magnetic fields in opposite or different directions, over a short distance. This may include the fluid flowing through three or more magnetic transitions or magnetic pole reversals of at least 1700 Gauss over a one foot length of a magnet fluid conditioner. In another embodiment, the fluid flowing through twelve or more magnetic transitions (also referred to as magnetic pole reversals) with a magnetic flux density in the center of the flow path of at least 1700 Gauss as the fluid flows along a one foot length of a magnet fluid conditioner. This is believed to greatly enhance the effectiveness of the present invention. The capability to provide more than one flow path can be considered an aspect of the present invention in certain embodiments. The various aspects of the invention are detailed, described, shown or defined herein.

Thus, it is apparent that there has been provided, in accordance with the present invention, a fluid conditioning system and method that satisfies one or more of the advantages set forth above. Further, a new magnetic fluid conditioner is provided that provides desired properties, although the fluid conditioning system of the present invention is not limited to the use of these specific magnetic fluid conditioners. Although the preferred embodiments have been described in detail, it should be understood that various changes, substitutions, and alterations can be made herein without departing from the scope of the present invention, even if all of the advantages and benefits identified above are not present. For example, the various embodiments and examples shown in the drawings and descriptions provided herein illustrate that the present invention may be implemented and embodied in numerous different ways that still fall within the scope of the present invention, whether expressly shown herein or not. For example, the various elements or components may be combined or integrated in another system or certain features may not be implemented. Also, the techniques, systems, sub-systems, and methods described and illustrated in the preferred embodiment as discrete or separate may be combined or integrated with other systems, designs, techniques, or methods without departing from the scope of the present invention. For example, the magnetic fluid conditioners can be placed in a variety of locations, including locations not specifically discussed herein. Other examples of changes, substitutions, and alterations are readily ascertainable by one skilled in the art and could be made without departing from the spirit and scope of the present invention.

What is claimed is:

1. A fluid conditioning system to treat a flowing fluid that includes unrefined crude oil, the fluid conditioning system comprising:
   a storage tank operable to store the flowing fluid, the storage tank having an inlet to receive the flowing fluid, and an outlet operable to discharge the flowing fluid;
   a separator operable to separate oil and gas having an inlet to receive and an outlet to discharge the flowing fluid;
   a pump having an inlet and an outlet, the pump in fluid communication with the outlet of the separator and in fluid communication with the inlet of the storage tank through the outlet of the pump, and in fluid communication with the outlet of the storage tank through the inlet of the pump, the pump operable to receive the flowing fluid at its inlet and to discharge the flowing fluid at its outlet at a higher pressure;
   a magnetic fluid conditioner operable to receive the flowing fluid at a first end, to subject the flowing fluid to a magnetic flux with a plurality of a singularly alternating opposing magnetic transitions, and to discharge the flowing fluid at a second end, the magnetic fluid conditioner located at a first location upstream of the separator and at a second location between the outlet of the pump and the inlet of the storage tank, the magnetic fluid conditioner in fluid communication with the outlet of the pump through the first end of the magnetic fluid conditioner, and in fluid communication with the inlet of the storage tank through the second end of the magnetic fluid conditioner, wherein the flowing fluid is recirculated through the fluid conditioning system so the flowing fluid flows through the magnetic fluid conditioner multiple times to reduce the formation of precipitates in the flowing fluid.

2. The fluid conditioning system of claim 1, further comprising:
   a heater having an input and an output, and operable to increase the temperature of the flowing fluid, the heater positioned at a third location between the pump and the storage tank.

3. The fluid conditioning system of claim 1, further comprising:
   a heater having an input and an output, and operable to increase the temperature of the flowing fluid, the heater positioned to receive the flowing fluid, and the heater operable to receive the flowing fluid at the input of the heater and to discharge the heated flowing fluid at the output of the heater.

4. The fluid conditioning system of claim 1, further comprising:
   a second magnetic fluid conditioner operable to receive the flowing fluid at a first end, to provide a magnetic field to the flowing fluid, and to discharge the flowing fluid at a second end, the second magnetic fluid conditioner located between the inlet of the pump and the outlet of the storage tank, the second magnetic fluid conditioner in fluid communication with the inlet of the pump through the second end of the second magnetic fluid conditioner, and in fluid communication with the outlet of the storage tank through the first end of the second magnetic fluid conditioner.

5. The fluid conditioning system of claim 1, wherein the flowing fluid is recirculated through the fluid conditioning system so the flowing fluid flows through the magnetic fluid conditioner multiple times to convert solid precipitates in the flowing fluid to a liquid.

6. The fluid conditioning system of claim 1, wherein the magnetic fluid conditioner provides a magnetic field with a magnetic flux density to the flowing fluid that is equal to at least 1700 Gauss.

7. The fluid conditioning system of claim 1, wherein the magnetic fluid conditioner provides a magnetic field with a magnetic flux density to the flowing fluid that is equal to a level at or between at least 2800 Gauss to 5000 Gauss.

8. The fluid conditioning system of claim 1, wherein the magnetic fluid conditioner provides a magnetic field with a magnetic flux density to the flowing fluid that is equal to a level at or between at least 4000 Gauss to 5000 Gauss.

9. The fluid conditioning system of claim 1, wherein the magnetic fluid conditioner includes:
   a sleeve having a first end, a second end, an internal surface area, an external surface area, and an internal volume of the sleeve defined by the boundaries of the first end, the second end and the internal surface area of the sleeve;
   a cylindrical member having a first end, a second end, an internal surface area, an external surface area, and a hollow internal volume of the cylindrical member defined by the boundaries of the first end, the second end and the internal surface area of the cylindrical member;
   a first plurality of magnets stacked upon one another in a singularly alternating magnetic attraction orientation to hold the stacked magnets to one another to form a first stack of magnets;
   a second plurality of magnets stacked upon one another in a singularly alternating magnetic attraction orientation to hold the stacked magnets to one another to form a second stack of magnets;
   wherein the first stack of magnets are positioned along a first portion of the external surface of the cylindrical member, and the second stack of magnets are positioned opposite and in a complementary singularly alternating relation to the first stack of magnets along a second portion of the external surface of the cylindrical member such that a magnetic attraction is established between the first stack of magnets and the second stack of magnets through the hollow internal volume of the cylindrical member to apply a magnetic flux density to the hollow internal volume, and to hold the first stack of magnets along the first portion of the external surface of the cylindrical member, and to hold the second stack of magnets along the second portion of the external surface of the cylindrical member; and
   wherein the cylindrical member, the first stack of magnets and the second stack of magnets are positioned in the internal volume of the sleeve, and the hollow internal volume of the cylindrical member serves as the flow path for flowing fluid to flow from the first end of the cylindrical member to the second end of the cylindrical member.

10. The fluid conditioning system of claim 9, wherein the magnetic fluid conditioner provides a magnetic field with a magnetic flux density to the flowing fluid that is equal to at least 1700 Gauss.

11. A magnetic fluid conditioner for applying a magnetic flux density to a fluid, which includes unrefined crude oil, flowing through a pipe to reduce the formation of precipitates in the fluid, the magnetic fluid conditioner comprising:
   a sleeve having a first end, a second end, an internal surface area, an external surface area, and an internal volume of the sleeve defined by the boundaries of the first end, the second end and the internal surface area of the sleeve;
   a cylindrical member having a first end, a second end, an internal surface area, an external surface area, and a hollow internal volume of the cylindrical member defined by the boundaries of the first end, the second end and the internal surface area of the cylindrical member;
   a first plurality of magnets stacked upon one another in a singularly alternating magnetic attraction orientation to hold the stacked magnets to one another to form a first stack of magnets;
   a second plurality of magnets stacked upon one another in a singularly alternating magnetic attraction orientation to hold the stacked magnets to one another to form a second stack of magnets;
   wherein the first stack of magnets are positioned along a first portion of the external surface of the cylindrical member, and the second stack of magnets are positioned opposite and in a complementary singularly alternating relation to the first stack of magnets along a second portion of the external surface of the cylindrical member such that a magnetic attraction is established between the first stack of magnets and the second stack of magnets through the hollow internal volume of the cylindrical member to apply a magnetic flux density to the hollow internal volume, and to hold the first stack of magnets along the first portion of the external surface of the cylindrical member, and to hold the second stack of magnets along the second portion of the external surface of the cylindrical member; and
   wherein the cylindrical member, the first stack of magnets and the second stack of magnets are positioned in the internal volume of the sleeve, and the hollow internal volume of the cylindrical member serves as the flow path for fluid to flow from the first end of the cylindrical member to the second end of the cylindrical member, such that a fluid flowing from the first end of the cylindrical member to the second end of the cylindrical member will be subjected to a magnetic flux density with a plurality of magnetic transitions.

12. The magnetic fluid conditioner of claim 11, wherein the magnetic flux density applied to the hollow internal volume of the cylindrical member is equal to at least 1700 Gauss.

13. The magnetic fluid conditioner of claim 11, wherein the magnetic flux density applied to the hollow internal volume of the cylindrical member is equal to a level at or between at least 2800 Gauss to 5000 Gauss.

14. The magnetic fluid conditioner of claim 11, wherein the magnetic flux density applied to the hollow internal volume of the cylindrical member is equal to a level at or between at least 4000 Gauss to 5000 Gauss.

15. The magnetic fluid conditioner of claim 11, further comprising:

an epoxy positioned between at least a first portion of the internal volume of the sleeve and a first portion of the cylindrical member.

16. The magnetic fluid conditioner of claim 11, further comprising:
an epoxy positioned between at least a first portion of the internal volume of the sleeve, a first portion of the first stack of magnets, and a first portion of the second stack of magnets.

17. The magnetic fluid conditioner of claim 11, wherein the cylindrical member is a rectangular cylindrical member.

18. The magnetic fluid conditioner of claim 11, wherein the cylindrical member is a circular cylindrical member.

19. The magnetic fluid conditioner of claim 11, wherein the first plurality of magnets and the second plurality of magnets include multi-pole magnets that include at least four poles.

20. The magnetic fluid conditioner of claim 11, wherein the first plurality of magnets and the second plurality of magnets establish a magnetic flux density in the portion of the flow path adjacent to the first portion of the external surface of the cylindrical member and the second portion of the external surface of the cylindrical member.

21. The magnetic fluid conditioner of claim 11, wherein the first plurality of magnets and the second plurality of magnets establish a magnetic flux density that includes at least three magnetic transitions along one foot of the flow path extending in a direction generally from the first end to the second end of the cylindrical member.

22. The magnetic fluid conditioner of claim 11, wherein the first plurality of magnets and the second plurality of magnets establish a magnetic flux density that includes at least eleven magnetic transitions along one foot of the flow path extending in a direction generally from the first end to the second end of the cylindrical member.

23. The magnetic fluid conditioner of claim 11, wherein the first plurality of magnets and the second plurality of magnets establish a magnetic flux density that includes at least thirty magnetic transitions along one foot of the flow path extending in a direction generally from the first end to the second end of the cylindrical member.

24. The magnetic fluid conditioner of claim 11, further comprising a second cylindrical member positioned parallel with the cylindrical member, and including a third plurality of magnets stacked upon one another in a magnetic attraction orientation to hold the stacked magnets to one another to form a third stack of magnets, wherein the third stack of magnets are positioned along a first portion of the external surface of the second cylindrical member, and the second stack of magnets are positioned along a second portion of the external surface of the second cylindrical member such that a magnetic attraction is established between the second stack of magnets and the third stack of magnets through a hollow internal volume of the second cylindrical member to apply a magnetic flux density to the hollow internal volume of the second cylindrical member, and to hold the third stack of magnets along the first portion of the external surface of the second cylindrical member, and to hold the second stack of magnets along the second portion of the external surface of the second cylindrical member.

25. A fluid conditioning system to treat a flowing fluid, which included unrefined crude oil, the fluid conditioning system comprising:
a storage tank operable to store the flowing fluid, the storage tank having an inlet to receive the flowing fluid, and an outlet operable to discharge the flowing fluid;
a separator operable to separate oil and gas having an inlet to receive and an outlet to discharge the flowing fluid;
a pump having an inlet and an outlet, the pump in fluid communication with the outlet of the separator and in fluid communication with the inlet of the storage tank through the outlet of the pump, and in fluid communication with the outlet of the storage tank through the inlet of the pump, the pump operable to receive the flowing fluid at its inlet and to discharge the flowing fluid at its outlet at a higher pressure; and
a magnetic fluid conditioner operable to receive the flowing fluid at a first end, to subject the flowing fluid to a magnetic flux with a plurality of singularly alternating magnetic transitions, and to discharge the flowing fluid at a second end, the magnetic fluid conditioner located at a first location upstream of the separator and at a second location between the inlet of the pump and the outlet of the storage tank, the magnetic fluid conditioner in fluid communication with the inlet of the pump through the second end of the magnetic fluid conditioner, and in fluid communication with the outlet of the storage tank through the first end of the magnetic fluid conditioner, and wherein the flowing fluid is recirculated through the fluid conditioning system so the flowing fluid flows through the magnetic fluid conditioner multiple times to reduce the formation of precipitates in the flowing fluid.

* * * * *